United States Patent
Shih et al.

(10) Patent No.: US 8,233,612 B2
(45) Date of Patent: Jul. 31, 2012

(54) NETWORK APPARATUS CAPABLE OF CANCELING FAR-END-CROSSTALK AND NETWORK SIGNAL PROCESSING METHOD THEREOF

(75) Inventors: Chih-Yung Shih, Taipei (TW);
Liang-Wei Huang, Taipei (TW);
Shieh-Hsing Kuo, Taipei County (TW)

(73) Assignee: Realtek Semiconductor Corp., Hsinchu (TW)

( * ) Notice: Subject to any disclaimer, the term of this patent is extended or adjusted under 35 U.S.C. 154(b) by 450 days.

(21) Appl. No.: 12/423,779

(22) Filed: Apr. 14, 2009

(65) Prior Publication Data

US 2009/0257578 A1    Oct. 15, 2009

(30) Foreign Application Priority Data

Apr. 15, 2008   (TW) .............................. 97113580 A

(51) Int. Cl.
*H04M 9/00*    (2006.01)
*H04M 1/76*    (2006.01)
*H04M 7/00*    (2006.01)

(52) U.S. Cl. ...................................................... 379/417
(58) Field of Classification Search .................. 379/417
See application file for complete search history.

(56) References Cited

U.S. PATENT DOCUMENTS

| 6,212,225 | B1 * | 4/2001 | Agazzi ........................ 375/220 |
| 6,314,135 | B1 * | 11/2001 | Schneider et al. ............ 375/232 |
| 7,164,764 | B2 | 1/2007 | Zimmerman et al. |
| 2007/0258514 | A1 | 11/2007 | Wajcer |

FOREIGN PATENT DOCUMENTS

| TW | 345793 | 11/1998 |
| TW | 427083 | 3/2001 |

* cited by examiner

*Primary Examiner* — Alexander Jamal
(74) *Attorney, Agent, or Firm* — Thomas, Kayden, Horstemeyer & Risley, LLP

(57) ABSTRACT

The present invention provides a network apparatus capable of canceling far-end crosstalk (FEXT). When the network apparatus is under a training mode, hard data is provided to a FEXT canceller for performing FEXT cancellation. When the network apparatus is under a data mode, soft data is provided to the FEXT canceller for performing FEXT cancellation as well. Therefore, FEXT is effectively canceled, and consumption power of the network apparatus is saved.

15 Claims, 2 Drawing Sheets

NETWORK APPARATUS CAPABLE OF CANCELING FAR-END-CROSSTALK AND NETWORK SIGNAL PROCESSING METHOD THEREOF

BACKGROUND OF THE INVENTION

1. Field of the Invention

The present invention relates to a network apparatus and a network signal processing method, and more particularly, to a network apparatus capable of canceling far-end-crosstalk (FEXT) and a network signal processing method thereof.

2. Description of the Prior Art

In a communication system, a transmitter or a receiver could include a plurality of channels. However, signals in different channels may interfere with each other, which is generally called crosstalk. Crosstalk can be categorized into near end crosstalk (NEXT) and far end crosstalk (FEXT). NEXT indicates a crosstalk phenomenon as measured at the end of the cable nearest to the transmitter while FEXT indicates a crosstalk phenomenon as measured at the end of the cable nearest the receiver. Both will cause the result of lowering signal qualities at a corresponding receiver.

In conventional FEXT cancellation techniques, a precode FEXT canceller is disposed at a transmitter for partially canceling in advance crosstalk noises due to other channels, and a FEXT canceller is also disposed at a corresponding receiver for further canceling the noises. Related arts of FEXT cancellation techniques may be gathered from U.S. Pat. No. 7,164,764. However, since FEXT cancellers are disposed and simultaneously used at both the transmitter and the receiver, related power consumption throughout a communication system becomes significant. Moreover, parameters referenced by the FEXT canceller at the receiver will continuously vary significantly so that noises cannot be stably filtered off.

SUMMARY OF THE INVENTION

In view of the above-mentioned problems, an object of the invention is to provide a network apparatus capable of effectively canceling FEXT with low power consumption.

The claimed invention discloses a network apparatus. The network apparatus comprises a first equalization module, a multiplexer, a far-end-crosstalk (FEXT) canceller, and a second equalization module. The first equalization module is for equalizing a first network signal to output a first output equalization signal, and for outputting both a first calculated value and a second calculated value in equalization. The first calculated value is a soft data value, and the second calculated value is a hard data value. The multiplexer is coupled to the first equalization module, for determining output of the first calculated value or the second calculated value according to a selection control signal. The FEXT canceller coupled to the multiplexer, for outputting a FEXT canceling signal according to the first calculated value or the second calculated value outputted from the multiplexer. The second equalization module is coupled to the FEXT canceller, for equalizing a second network signal according to the FEXT canceling signal, and for outputting a second output equalization signal. When the network apparatus is operated under a data mode, the multiplexer is controlled according to the selection control signal to output the first calculated value to the FEXT canceller. When the network apparatus is operated under a training mode, the multiplexer is controlled according to the selection control signal to output the second calculated value to the FEXT canceller.

The claimed invention discloses a network signal processing method used on a network apparatus. The network signal processing method comprises equalizing a first network signal for outputting a first calculated value and a second calculated value; determining to output the first calculated value or the second calculated value with a multiplexer; outputting a FEXT canceling signal according to the first calculated value or the second calculated value outputted from the multiplexer; and equalizing a second network signal and outputting an output equalization signal according to the FEXT canceling signal. The first calculated value is a soft data value, and the second calculated value is a hard data value. When the network apparatus is operated under a first mode, the multiplexer outputs the first calculated value so as to output the FEXT canceling signal. When the network apparatus is operated under a second mode, the multiplexer outputs the second calculated value so as to output the FEXT canceling signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
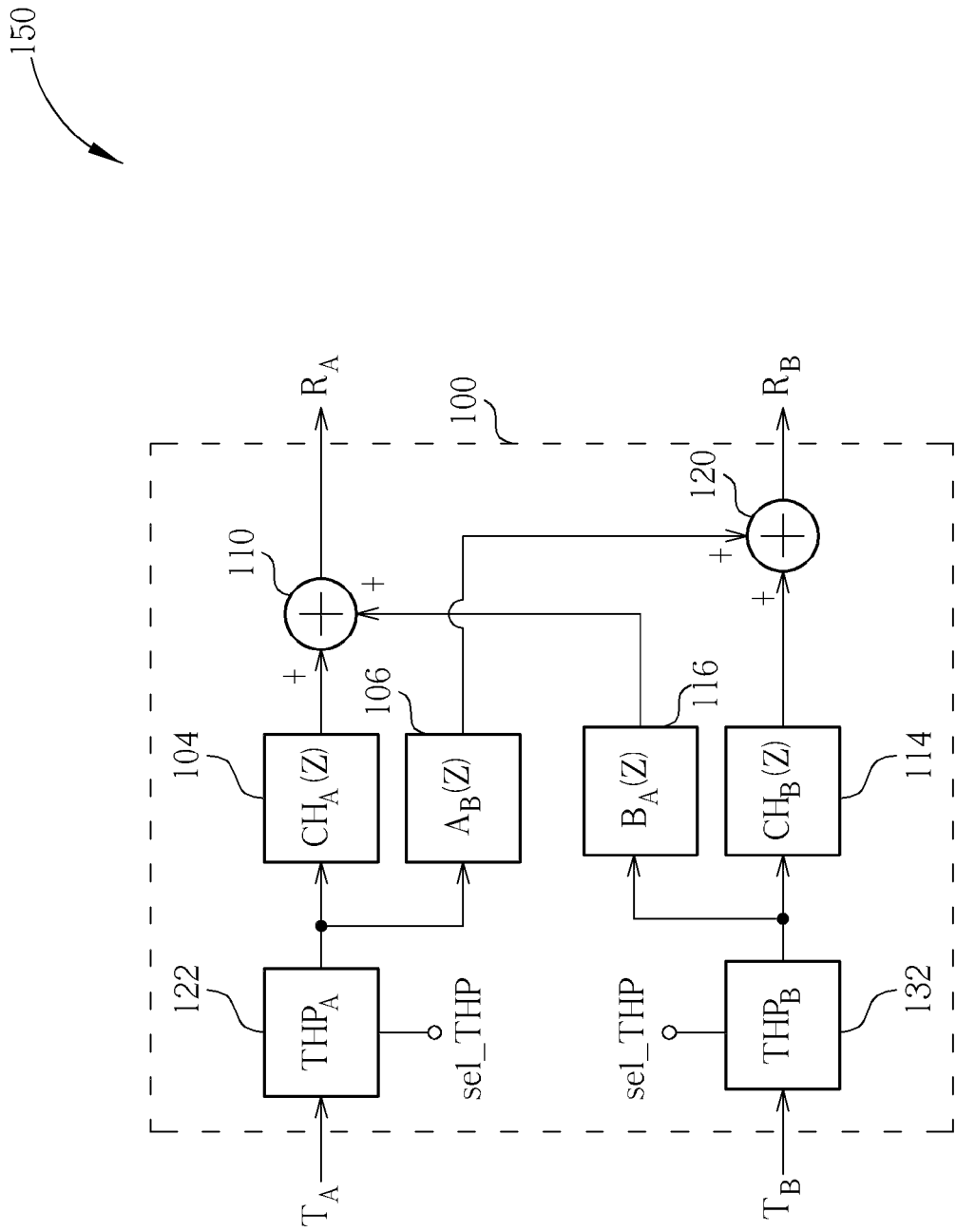
FIG. 1 illustrates a FEXT model at a transmitter of a network apparatus according to a preferred embodiment of the present invention.

Please refer to FIG. 1, which illustrates a FEXT model of a transmitter disposed in a network apparatus according to a preferred embodiment of the present invention. Transmitter 100 of the network apparatus includes a first channel 104, a first FEXT coupler 106, a first adder 110, a first Tomlison-Harashima Precoding (THP) filter 122, a second channel 114, a second FEXT coupler 116, a second adder 120, and a second THP filter 132. It is noted that both the first THP filter 122 and the second THP filter 132 can be enabled or disabled by switch signal sel_THP according to different operation modes of the network apparatus.

The transmitter 100 is configured to utilize transmitting signals $T_A$ and $T_B$ to generate and transmit the receiving signals $R_A$ and $R_B$ to a receiver. The first channel 104 has a channel response $CH_A(z)$, which may also be indicated as a channel response of a channel A, whereas the second channel 114 has a channel response $CH_B(z)$, which may also be indicated as a channel response of a channel B. The first FEXT coupler 106 has a response $A_B(z)$, whereas the second FEXT coupler 116 has a response $B_A(z)$. The first THP filter 122 has a response $THP_A$, whereas the second THP filter 132 has a response $THP_B$.

First of all, a training mode of the network apparatus of the present invention is introduced. Under the training mode, both the first THP filter 122 and the second THP filter 132 are disabled. The receiver signal $R_A$ is indicated as:

$$R_A = T_A * CH_A(z) + T_B * B_A(z) \quad \text{Equation (1)};$$

The receiver signal $R_B$ is indicated as:

$$R_B = T_B * CH_B(z) + T_A * A_B(z) \quad \text{Equation (2)}.$$

In Equation (1), the term $T_B * B_A(z)$ indicates FEXT generated from the channel B to the channel A. Similarly, the term $T_A * A_B(z)$ indicates FEXT generated from the channel A to the channel B.

Secondly, a data mode of the network apparatus of the present invention is introduced, where the data mode is activated right after the training mode completed. Under the data mode, both the first THP filter 122 and the second THP filter 132 are enabled. At this time, the receiver signal $R_A$ is indicated as:

$$R_A = T_A * THP_A * CH_A(z) + T_B * THP_B * B_A(z) \qquad \text{Equation (3);}$$

The receiver signal $R_B$ is indicated as:

$$R_B = T_B * THP_B * CH_B(z) + T_A * THP_A * A_B(z) \qquad \text{Equation (4).}$$

The term $T_B * THP_B * B_A(z)$ indicates FEXT generated from the channel B to the channel A, whereas the term $T_A * THP_A * A_B(z)$ indicates FEXT generated from the channel A to the channel B.

One object of the present invention is to minimize the parameter variations of the FEXT cancellers, stabilizing noise filtering whether the THP filters are activated or disabled. According to the descriptions related to FIG. 1, FEXT noises shown in Equations (1), (2), (3), and (4) are required to be taken into considerations for stabilizing noise filtering.

Figure 2:
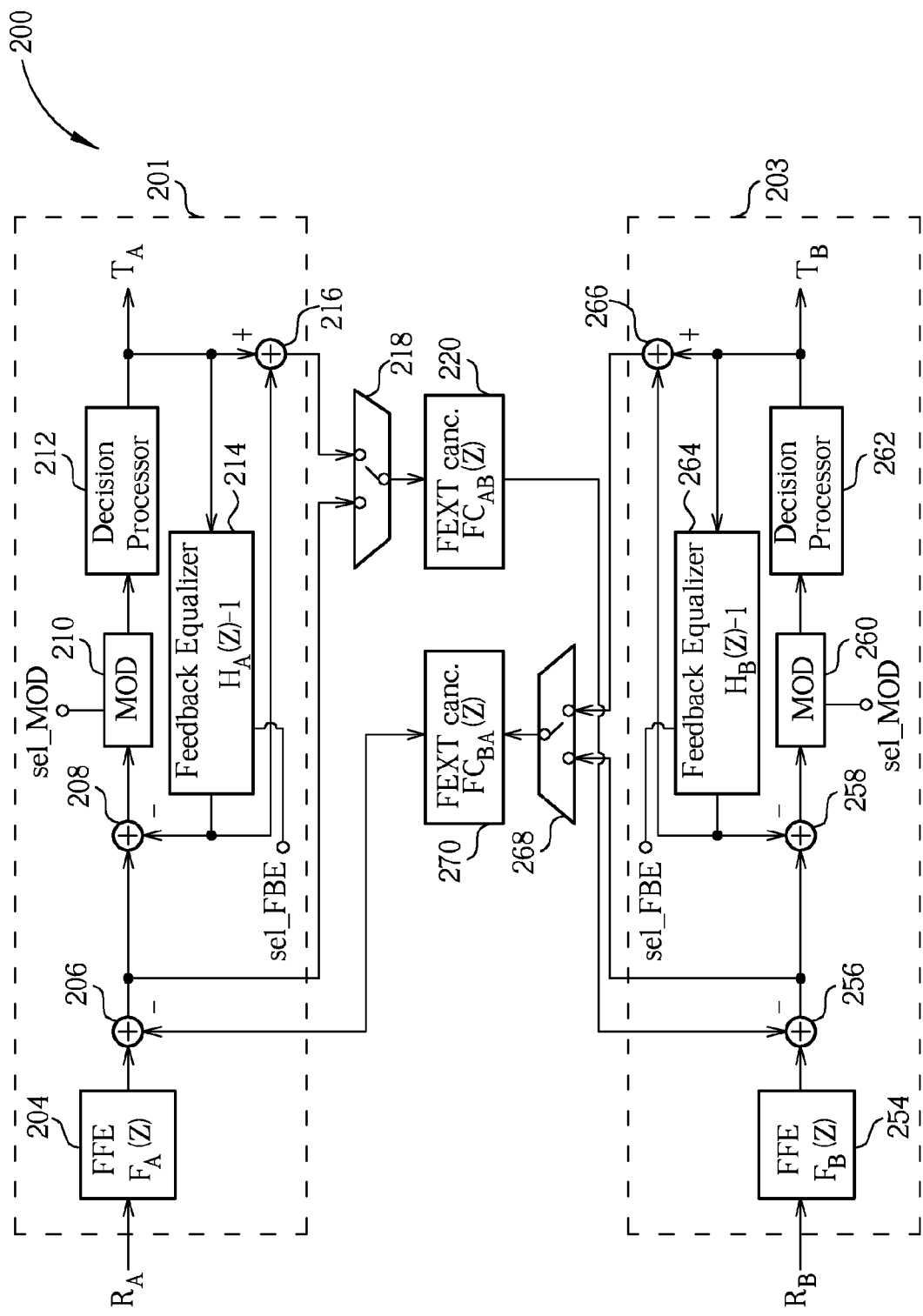
FIG. 2 illustrates a FEXT model of a receiver in the network apparatus of the present invention.

Please further refer to FIG. 2, which illustrates a FEXT model of receiver 200 disposed in the network apparatus according to a preferred embodiment of the present invention. It is noted that though the network apparatus shown in FIG. 2 merely uses two channels, a network apparatus having two or more channels according to other embodiments of the present invention may also be implemented. In other words, a number of used channels in the network apparatus of the present invention should not be limited to this embodiment.

As shown in FIG. 2, a receiver 200 of the network apparatus includes a first equalization module 201, a second equalization module 203, a first multiplexer 218, a second multiplexer 268, a first FEXT canceller 220, and a second FEXT canceller 270. The first equalization module 201 includes a first feed-forward equalizer 204, a first subtractor 206, a second subtractor 208, a first modulo processor 210, a first decision processor 212, a first feedback equalizer 214, and a first adder 216. The second equalization module 203 includes a second feed-forward equalizer 254, a third subtractor 256, a fourth subtractor 258, a second modulo processor 260, a second decision processor 262, a second feedback equalizer 264, and a second adder 266. The first equalization module 201 is used for equalizing a first network signal for outputting a first output equalization signal, where the first network signal is the receiving signal $R_A$, and the first output equalization signal corresponds to the transmitting signal $T_A$ shown in FIG. 1.

The second equalization module 203 is used for equalizing a second network signal according to a FEXT canceling signal outputted from the first FEXT canceller 220, and for outputting a second output equalization signal, where the second network signal is the receiving signal $R_B$, and the second output equalization signal is corresponds to the transmitting signal $T_B$ shown in FIG. 1. The feed-forward equalizer 204 receives and equalizes the receiving signal $R_A$ for outputting a feed-forward equalization signal. Both the subtractors 206 and 208 are used for operating on both the feed-forward equalization signal and a FEXT canceling signal inputted from the second equalization module 203 to output a calculated value. Note that the subtractor 206 is used for subtracting the FEXT canceling signal from the feed-forward equalization signal to output a first intermediate calculated value, and that the subtractor 208 is used for subtracting a feedback equalization signal from the first intermediate calculated value to output the calculated value. The modulo processor 210 is used for performing a modulo operation on the calculated value to output a modulo processing signal. The decision processor 212 is used for outputting the transmitting signal $T_A$ according to the modulo processing signal. The feedback equalizer 214 is used for feedback-equalizing the first output equalization signal for outputting the feedback equalization signal. The adder 216 is used for adding the transmitter signal $T_A$ with the feedback equalization signal for outputting a second intermediate calculated value.

According to a preferred embodiment of the present invention, both the first FEXT canceller 220 and the second FEXT canceller 270 may be implemented with finite impulse response (FIR) filters. Coupling and connection between all the above-mentioned elements and related input/output signals is shown in FIG. 2, and omitted herein for the sake of brevity. It is noted that both the first feedback equalizer 214 and the second feedback equalizer 264 are also enabled or disabled by the switch signal sel_FBE, and both the first modulo processor 210 and the second modulo processor 260 are enabled or disabled by the switch signal sel_MOD as well.

Operations of the receiver 200 are described in detail as follows. First, right after the network apparatus of the present invention is booted, both the first THP filter 122 and the second THP filter 132 of the transmitter 100 are disabled under the training mode of said network apparatus. At this time, according to a selection control signal sel the first multiplexer 218 outputs the second intermediate calculated value from the first adder 216 of the first equalization module 201, where the calculated value from the first adder 216 is a hard data value in equalization, to the first FEXT canceller 220 to perform FEXT cancellation on the second equalization module 203. Similarly, under the training mode of the network apparatus of the present invention, according to the selection control signal sel the second multiplexer 268 outputs a second intermediate calculated value from the second adder 266 of the second equalization module 203, which is a hard data value as well, to the second FEXT canceller 270 to perform FEXT cancellation on the first equalization module 201. Note that in the present embodiment, though the calculated values from both the first adder 216 and the second adder 266 are determined to be respectively outputted by the first multiplexer 218 and the second multiplexer 268 and serve as reference signals in FEXT cancellation, the determination should not be limitations to the present invention. In other words, the first multiplexer 218 and the second multiplexer 268 may also determine other hard data as the reference signals in FEXT cancellation. For example, the first output equalization signal $T_A$ from the first decision processor 212 and the second output equalization signal $T_B$ from the second decision processor 262 may also serve as the reference signals in FEXT cancellation in other embodiments of the present invention.

Under the training mode of the network apparatus of the present invention, FEXT processed by the first feed-forward equalizer 204 is indicated as:

$$T_B * B_A(z) * F_A(z) \qquad \text{Equation (5);}$$

An output signal from the third subtractor 256 is indicated as:

$$T_B * CH_B(z) * F_B(z) \qquad \text{Equation (6).}$$

For completely canceling FEXT from the first feed-forward equalizer 204, and according to both Equation (5) and Equation (6), the following equation has to be satisfied:

$$T_B * B_A(z) * F_A(z) = [T_B * CH_B(z) * F_B(z)] * FC_{BA}(z) \qquad \text{Equation (7);}$$

Suppose $H_B(z)=CH_B(z)*F_B(z)$ is satisfied so that Equation (7) may be rewritten as follows:

$$T_B*B_A(z)*F_A(z)=T_B*H_B(z)*FC_{BA}(z)=(T_B*(H_B(z)-1)+T_B)*FC_{BA}(z) \quad \text{Equation (8)}.$$

The term $H_B(z)-1$ indicates a response of the second feedback equalizer 264 so that the term $T_B*(H_B(z)-1)+T_B$ indicates an output signal of the second adder 266. Appropriate parameters in a response $FC_{BA}(z)$ of the second FEXT canceller 270 may be simulated according to Equation (8) as follows:

$$FC_{BA}(z)=B_A(z)*F_A(z)/H_B(z) \quad \text{Equation (9)}.$$

Similarly, parameters of a response $FC_{AB}(z)$ of the first FEXT canceller 220 may also be simulated according to the following:

$$T_A*A_B(z)*F_B(z)=T_A*H_A(z)*FC_{AB}(z)=(T_A*(H_A(z)-1)+T_A)*FC_{AB}(z) \quad \text{Equation (10)};$$

Therefore, appropriate parameters in the response $FC_{AB}(z)$ may also be simulated according to Equation (10) and be indicated as follows:

$$FC_{AB}(z)=A_B(z)*F_B(z)/H_A(z) \quad \text{Equation (11)}.$$

As can be observed in the abovementioned equations, under the training mode of the network apparatus of the present invention, parameters used in the first FEXT canceller 220 and the second FEXT canceller 270 may be derived according to Equation (11) and Equation (10) respectively.

After the network apparatus of the present invention is booted for a while, the first THP filter 122 and the second THP filter 132 of the transmitter 100 are enabled, and both the first feedback equalizer 214 and the second feedback equalizer 264 are shut down or disabled by continuously inputting bits 0 so that the network apparatus of the present invention enters the data mode. At this time, according to the selection control signal sel the first multiplexer 218 outputs the first intermediate calculated value from the first subtractor 206 of the first equalization module 201, where the first intermediate calculated value is a soft data value in equalization, to the first FEXT canceller 220 for performing FEXT cancellation on the second equalization module 203. Similarly, under the data mode of the network apparatus of the present invention, according to the selection control signal sel the second multiplexer 268 outputs a calculated value from the third subtractor 256 of the second equalization module 203, where the calculated value is a soft data value in equalization, to the second FEXT canceller 270 for performing FEXT cancellation on the first equalization module 201. Note that a reference signal in FEXT cancellation herein is not limited to the calculated values from the first subtractor 206 and the third subtractor 256 in the present invention, i.e., other types of soft data may also be determined to be the reference signal in FEXT cancellation. Therefore, under the data mode of the network apparatus of the present invention, reference signals of the first FEXT canceller 220 or the second FEXT canceller 270 do not vary significantly so that system stability is raised.

Under the data mode of the network apparatus of the present invention, after the receiver signal $R_A$ is processed by the feed-forward equalizer 204, a corresponding FEXT is $T_R*THP_B*B_A(z)*F_A(z)$. Moreover, a clean signal on the channel B, which is not interfered by FEXT from the channel A, is $T_B*THP_B*CH_B(z)$. For entirely canceling FEXT from the first feed-forward equalizer 204, the following equation has to be satisfied:

$$T_B*THP_B*B_A(z)*F_A(z)=[T_B*THP_B*CH_B*F_B(z)]*FC_{BA}(z) \quad \text{Equation (12)}.$$

Note that the first THP filter 122 and the second THP filter 132 acquire the following properties for each channel:

$$THP_A=1/H_A(z) \quad \text{Equation (13)};$$

$$THP_B=1/H_B(z) \quad \text{Equation (14)}.$$

According to the definition of the response $H_B(z)$, Equation (12), and Equation (13), Equation (12) may be rewritten as follows:

$$T_B*THP_B*B_A(z)*F_A(z)=T_B*FC_{BA}(z) \quad \text{Equation (15)}.$$

According to Equation (13) and Equation (15), the FEXT response $FC_{BA}(z)$ from the channel B toward the channel A is indicated as follows:

$$FC_{BA}(z)=THP_B*B_A(z)*F_A(z)=B_A(z)*F_A(z)/H_B(z) \quad \text{Equation (16)}.$$

As can be observed from Equation (9) and Equation (16), whether the THP filters are activated or shut down, parameters in the FEXT response $FC_{BA}(z)$ are substantially the same.

Similarly, the FEXT response $FC_{BA}(z)$ from the channel A toward the channel B is indicated as follows:

$$FC_B(z)=THP_A*A_B(z)*F_B(z)=A_B(z)*F_B(z)/H_A(z) \quad \text{Equation (17)}.$$

As can be observed from Equation (11) and Equation (17), whether the THP filters are activated or shut down, parameters in the FEXT response $FC_{AB}(z)$ are the same.

According to the above descriptions, under the training mode of the network apparatus of the present invention, hard data are determined to be reference signals in FEXT cancellation; whereas under the data mode of the network apparatus of the present invention, soft data are determined to be reference signals in FEXT cancellation; and both modes lead to a same FEXT response. Therefore, under the data mode of the network apparatus of the present invention, even though soft data are used in FEXT cancellation, FEXT may also be entirely canceled, and moreover, related system stability is raised.

In a preferred embodiment of the present invention, under the training mode of the network apparatus of the present invention, the first feedback equalizer 214 and the second feedback equalizer 264 are enabled, and the first THP filter 122, the second THP filter 132, the first modulo processor 210, and the second modulo processor 260 are disabled. Under the data mode of the network apparatus of the present invention, the first feedback equalizer 214 and the second feedback equalizer 264 are disabled, and the first THP filter 122, the second THP filter 132, the first modulo processor 210, and the second modulo processor 260 are enabled. With the above disclosures, power consumption of the network apparatus is significantly reduced since some elements are disabled in different modes. In a preferred embodiment of the present invention, the network apparatus of the present invention is used on 10 GBASE-T Ethernet networks, however, the network apparatus of the present invention may also be used in other types of network.

Those skilled in the art will readily observe that numerous modifications and alterations of the device and method may be made while retaining the teachings of the invention.

What is claimed is:

1. A network apparatus comprising:
  a first equalization module operated in a first channel for equalizing a first network signal to output a first output equalization signal and both a first calculated value and a second calculated value in equalization, wherein the first calculated value is a soft data value, and the second calculated value is a hard data value;

a multiplexer coupled to the first equalization module, for selectively outputting the first calculated value or the second calculated value according to a selection control signal;

a far-end-crosstalk (FEXT) canceller coupled to the multiplexer, for outputting a FEXT canceling signal according to the first calculated value or the second calculated value outputted from the multiplexer; and a second equalization module coupled to the FEXT canceller and operated in a second channel other than the first channel, for equalizing a second network signal according to the FEXT canceling signal, and for outputting a second output equalization signal;

wherein when the network apparatus is operated under a data mode, the multiplexer is controlled according to the selection control signal to output the first calculated value to the FEXT canceller; and when the network apparatus is operated under a training mode, the multiplexer is controlled according to the selection control signal to output the second calculated value to the FEXT canceller.

2. The network apparatus of claim 1 wherein the first equalization module comprises:
a feed-forward equalizer receiving the first network signal for equalizing the first equalization signal to output a first feed-forward equalization signal; and
a calculation unit coupled to the feed-forward equalizer, for calculating on both the first feed-forward equalization signal and a second FEXT canceling signal to output the first calculated value.

3. The network apparatus of claim 2 wherein the calculation unit comprises:
a first subtractor coupled to the feed-forward equalizer for subtracting the second FEXT canceling signal from the first feed-forward equalization signal to output the first calculated value; and
a second subtractor coupled to the first subtractor, for subtracting a feedback equalization signal from the first calculated value to output an output calculated value.

4. The network apparatus of claim 3 wherein the first equalization module comprises:
a modulo processor coupled to the second subtractor, for performing a modulo operation on the output calculated value to output a modulo processing signal;
a decision processor coupled to the modulo processor, for outputting the first output equalization signal according to the modulo processing signal;
a feedback equalizer coupled to both the decision processor and the second subtractor in between, for feedback-equalizing the first output equalization signal to output the feedback equalization signal; and
an adder coupled to both the decision processor and the feedback equalizer, for adding the first output equalization signal with the feedback equalization signal to output the second calculated value.

5. The network apparatus of claim 1 wherein the first equalization module comprises:
a feedback equalizer for feedback-equalizing the first output equalization signal to output a feedback equalization signal;
wherein when the network apparatus is operated under the data mode, the feedback equalizer is disabled;
wherein when the network apparatus is operated under the training mode, the feedback equalizer is enabled.

6. The network apparatus of claim 1 further comprising:
a second multiplexer coupled to the second equalization module, for determining to output a third calculated value or a fourth calculated value, wherein the third calculated value is a soft data value, and the fourth calculated value is a hard data value; and a second FEXT canceller coupled to the second multiplexer, for outputting a second FEXT canceling signal to the first equalization module according to the third calculated value or the fourth calculated value outputted from the second multiplexer;

wherein the second equalization module outputs the third calculated value and the fourth calculated value during equalizing the second network signal.

7. The network apparatus of claim 6,
wherein when the network apparatus is operated under the data mode, the second multiplexer is controlled according to the selection control signal to forward the third calculated value to the second FEXT canceller;
wherein when the network apparatus is operated under the training mode, the second multiplexer is controlled according to the selection control signal to forward the fourth calculated value to the second FEXT canceller.

8. The network apparatus of claim 1 wherein the FEXT canceller is implemented with a finite impulse response (FIR) filter.

9. The network apparatus of claim 1 used on 10 GBASE-T Ethernet networks.

10. A network signal processing method used on a network apparatus, the network signal processing method comprising:
equalizing a first network signal operated in a first channel for outputting a first calculated value and a second calculated value, wherein the first calculated value is a soft data value, and the second calculated value is a hard data value;
selectively outputting the first calculated value or the second calculated value by a multiplexer;
outputting a FEXT canceling signal according to the first calculated value or the second calculated value outputted from the multiplexer; and
equalizing a second network signal operated in a second channel and outputting an output equalization signal according to the FEXT canceling signal;
wherein when the network apparatus is operated under a first mode, the multiplexer outputs the first calculated value so as to output the FEXT canceling signal; and when the network apparatus is operated under a second mode, the multiplexer outputs the second calculated value to output the FEXT canceling signal.

11. The network signal processing method of claim 10 wherein equalizing the first network signal comprises:
equalizing the first network signal to output a feed-forward equalization signal; and
performing a calculation on both the feed-forward equalization signal and a second FEXT canceling signal to output the first calculated value.

12. The network signal processing method of claim 11 wherein performing the calculation on both the feed-forward equalization signal and the second FEXT canceling signal comprises:
subtracting the second FEXT canceling signal from the feed-forward equalization signal so as to output the first calculated value.

13. The network signal processing method of claim 10 wherein the first mode is a data mode, and the second mode is a training mode.

14. The network signal processing method of claim 10 further comprising:
disabling a feedback equalizer when the network apparatus is operated under the first mode; and
enabling the feedback equalizer when the network apparatus is operated under the second mode.

15. The network signal processing method of claim 10 is used on 10 GBASE-T Ethernet networks.

* * * * *